United States Patent [19]

Lampes

[11] Patent Number: 5,241,827
[45] Date of Patent: Sep. 7, 1993

[54] MULTI-HOLE FILM COOLED COMBUSTER LINEAR WITH DIFFERENTIAL COOLING

[75] Inventor: Elias H. Lampes, Lynn, Mass.

[73] Assignee: General Electric Company, Cincinnati, Ohio

[21] Appl. No.: 695,488

[22] Filed: May 3, 1991

[51] Int. Cl.$^5$ .................................................. F23R 3/06
[52] U.S. Cl. .......................................... 60/754; 60/757
[58] Field of Search ............... 60/752, 754, 755, 756, 60/757, 261; 431/352

[56] References Cited

U.S. PATENT DOCUMENTS

| | | | |
|---|---|---|---|
| 2,785,878 | 3/1957 | Conrad | 60/754 |
| 3,091,924 | 6/1963 | Wilder . | |
| 3,527,543 | 9/1970 | Howald . | |
| 3,623,711 | 11/1971 | Thorstenson | 263/19 A |
| 3,777,484 | 12/1973 | Dibelius et al. | 60/757 |
| 4,071,194 | 1/1978 | Eckert et al. | 239/127.3 |
| 4,118,146 | 10/1978 | Dierberger | 416/97 A |
| 4,566,280 | 1/1986 | Burr | 60/757 |
| 4,642,993 | 2/1987 | Sweet . | |
| 4,653,983 | 3/1987 | Vehr . | |
| 4,664,597 | 5/1987 | Auxier et al. . | |
| 4,695,247 | 9/1987 | Enzaki et al. | 431/352 |
| 4,696,431 | 9/1987 | Buxe | 239/265.15 |
| 4,773,593 | 9/1988 | Auxier et al. | 239/127.3 |
| 4,833,881 | 5/1989 | Vdoviak et al. | 60/261 |
| 4,878,283 | 11/1989 | McLean | 29/163.6 |
| 4,896,510 | 1/1990 | Foltz | 60/757 |
| 4,923,371 | 5/1990 | Ben-Amoz | 416/97 R |
| 5,000,005 | 3/1991 | Kwan et al. | 60/757 |

FOREIGN PATENT DOCUMENTS

| | | |
|---|---|---|
| 486133A1 | 5/1992 | European Pat. Off. . |
| 1226751 | 3/1971 | United Kingdom . |
| 2221979A | 2/1990 | United Kingdom . |

OTHER PUBLICATIONS

R. E. Mayle et al, "Multihole Cooling Film Effectiveness and Heat Transfer," Nov. 1975, pp. 534–538.
D. A. Nealy et al, "Alternate Cooling Configuration for Gas Turbine Combustion Systems," May, 1985.
Dr. G. J. Sturgess, "Advanced Low-Emissions Catalytic-Combustor Program-Phase I Final Report," Jun. 1981, Report No. NASA-CR-159, pp. 75-76, 125-128, 141-142.

Primary Examiner—Richard A. Bertsch
Assistant Examiner—Timothy S. Thorpe
Attorney, Agent, or Firm—Jerome C. Squillaro; Nathan D. Herkamp

[57] ABSTRACT

A gas turbine engine combustor is provided with a single wall sheet metal liner having a generally annular shape, which may be corrugated, and contains at least one differential pattern of multi-hole film cooling holes. The differential pattern of cooling holes comprises patterns of small closely spaced sharply downstream angled film cooling holes disposed along portions of the liner so as to direct different amounts of film cooling air to different areas of the liner to accommodate differential heating along the liner. One embodiment of the invention includes a plurality of superimposed differential cooling hole patterns derived from a base pattern wherein each preferential pattern is formed by skipping patterns of cooling holes in the base pattern.

16 Claims, 7 Drawing Sheets

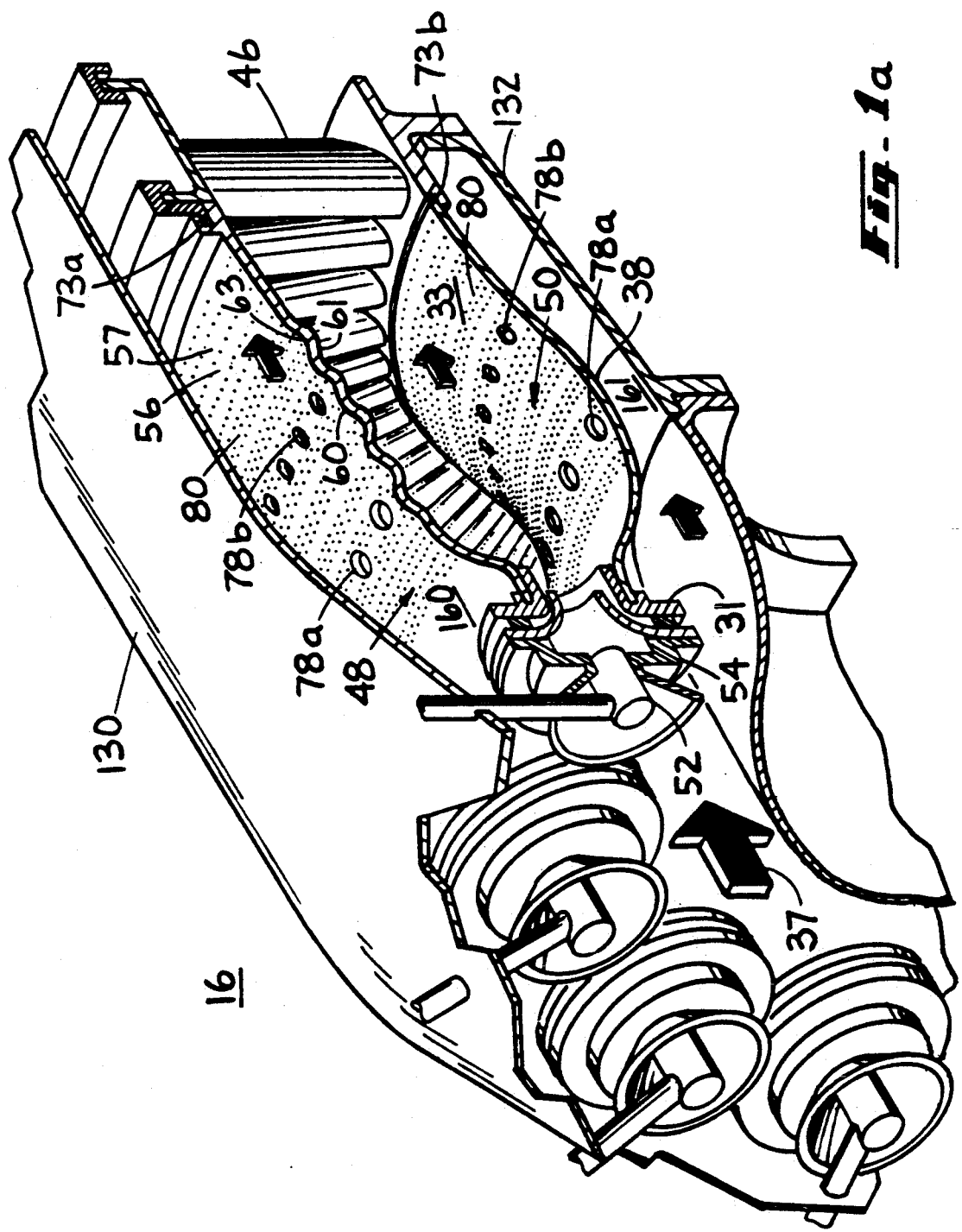

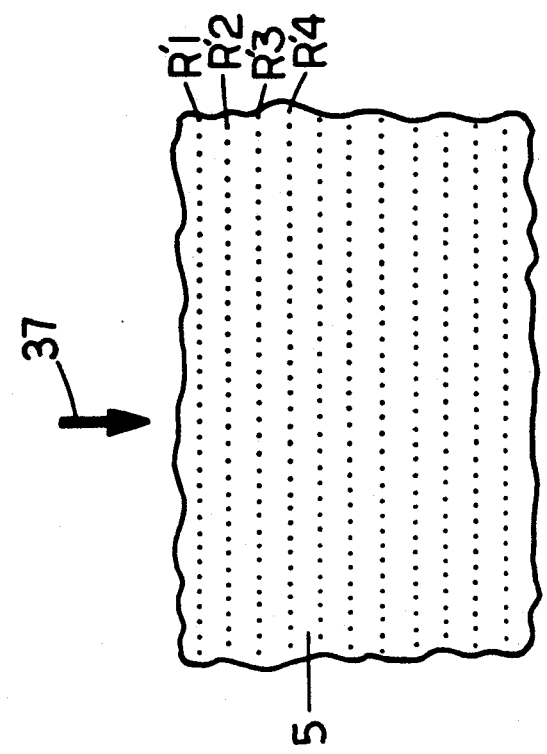
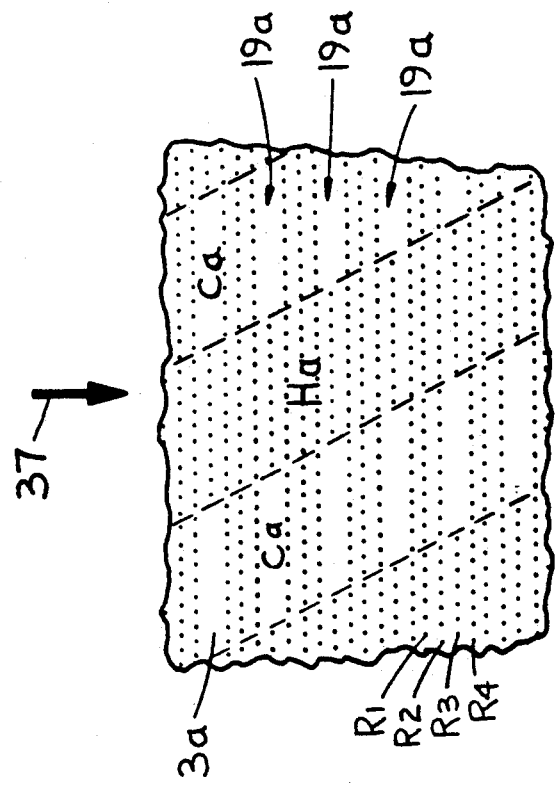
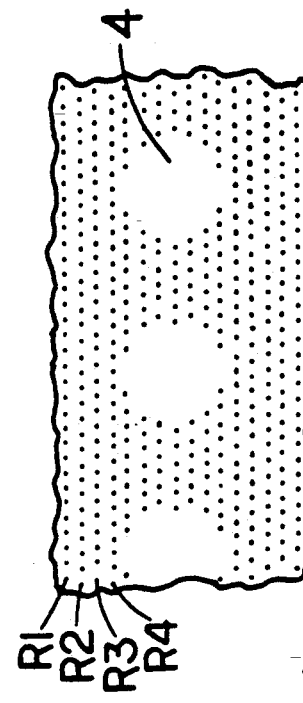

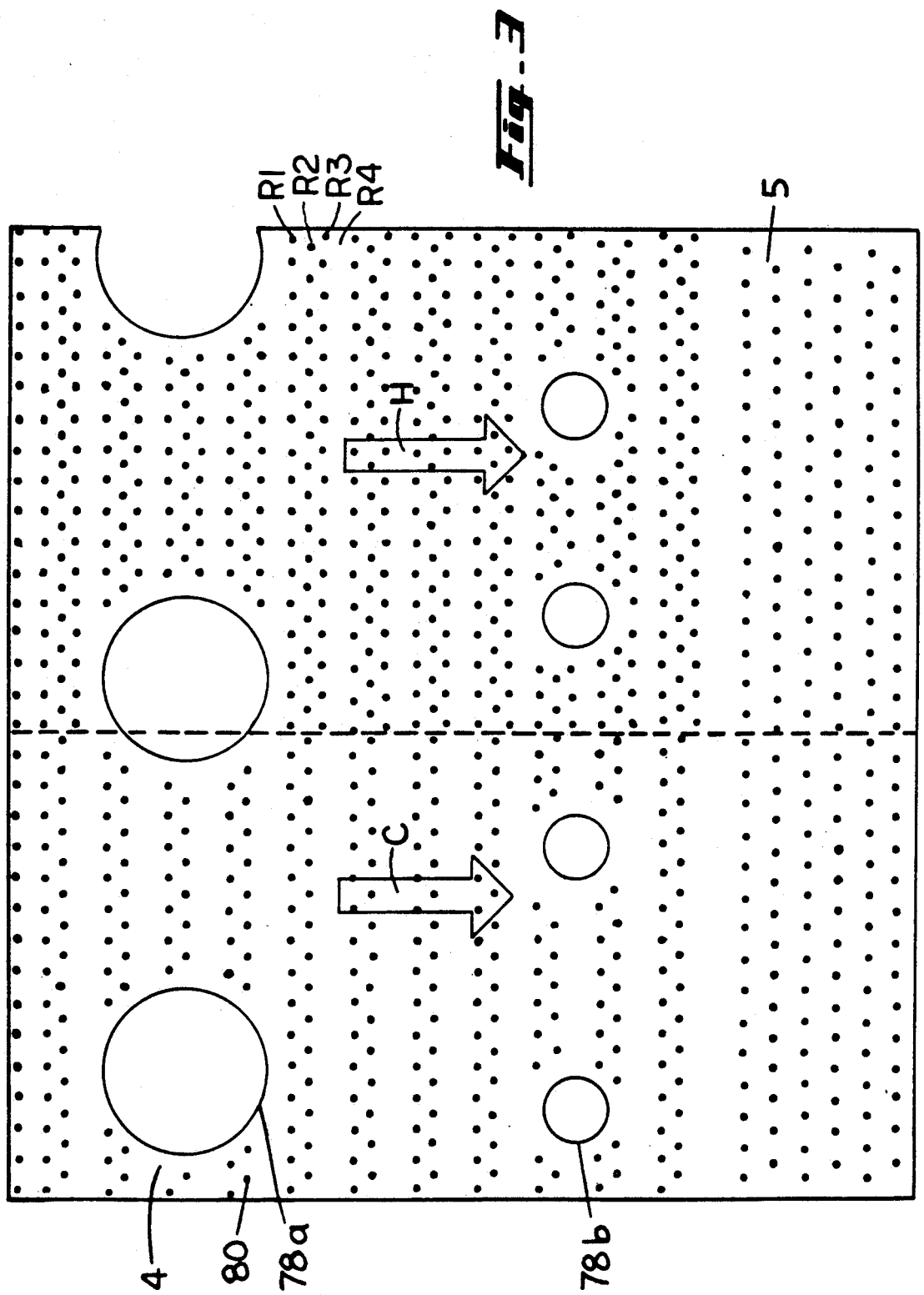

MULTI-HOLE FILM COOLED COMBUSTER LINEAR WITH DIFFERENTIAL COOLING

The invention described herein was made in the performance of work under U.S. Government NAVY contract N00019-80-C-0017 and the U.S. Government has rights therein.

BACKGROUND OF THE INVENTION

1. Field of the Invention

This invention relates to combustors used in gas turbine engines, and more particularly, to film cooling gas turbine engine combustor liners.

2. Description of Related Art

Combustor liners are generally used in the combustion section of gas turbine engines located between the compressor and turbine sections of the engine and in the exhaust sections of afterburning aircraft gas turbine engines. Combustors generally include an exterior casing and an interior combustor. Fuel is burned in the interior of the combustor producing a hot gas usually at an intensely high temperature such as 3,000° F. or even higher. A heat shield or combustor liner is provided to prevent this intense heat from damaging the combustion section and rest of the engine.

Some aircraft gas turbine engines, particularly ones that are capable of supersonic flight such as military fighters and bombers, have afterburners or augmenters located in the exhaust section of the engine. Heat shields or liners are also provided for afterburner engines to prevent the intense combustion heat from damaging the surrounding casing of the exhaust section or other parts of the engine and aircraft.

A more detailed discussion of the related art may be found in related U.S. Patent Application Ser. No. 07/614,418 entitled "GAS TURBINE ENGINE MULTI-HOLE FILM COOLED COMBUSTOR LINER AND METHOD OF MANUFACTURE", invented by Wakeman et al., filed Nov. 15, 1990, and U.S. Pat. application Ser. No. 07/614,368 entitled "COMBUSTOR LINER WITH CIRCUMFERENTIALLY ANGLED FILM COOLING HOLES", by Napoli, filed Nov. 15, 1990, both applications assigned to the same assignee as in the present application. Both of these references are incorporated herein by reference.

Engine designers have long sought to incorporate light weight easy to manufacture combustor liners capable of withstanding the temperatures and pressure differentials found in gas turbine engine combustors. To that end the invention described in the Wakeman reference provides a single wall, preferably sheet metal, annular combustor liner having multi-hole film cooling holes that are disposed through the wall of the liner at sharp downstream angles. The multi-hole film cooling holes are essentially cylindrical and spaced closely together to form at least one continuous pattern designed to provide film cooling over the length of the liner. The present invention provides multi-hole film cooling holes that are cylindrical and have a diameter of about 20 mils with a nominal tolerance of about ±2 mils, are spaced closely together about 6 ½ to 7 ½ hole diameters apart, have a downstream angle of 20 degrees with a nominal tolerance of about ÷1 degree. Axially adjacent holes are circumferentially offset by half the angle between circumferentially adjacent holes to further enhance the evenness of the cooling film injection points. The Wakeman reference further discloses an embodiment wherein the liner may be corrugated so as to form a wavy wall that is designed to prevent buckling and is particularly useful for aircraft gas turbine engine afterburners.

A phenomenon that occurs on combustor liners both in the main combustion section and in the afterburner combustion section is swirl, wherein swirled patterns of higher thermal degradation areas are formed on the liner in areas where relative hot zones exist. The patterns generally coincide with the swirl of the combustor flow induced by swirlers in the fuel nozzles that are used to promote better combustion and in the exhaust section by turbine nozzles. Liners subject to these uneven heating patterns are difficult and costly to cool.

Combustor liner cooling uses a significant percentage of cooling air that is taken from the compressor for the main combustion section and usually from the fan section for afterburner combustor liners. This is costly air in terms of fuel and power consumption and therefore aircraft engine designers are always seeking means for reducing the amount of cooling air required to cool afterburner liners. Sufficient cooling air is conventionally provided in order to cool the hottest areas caused by swirl and some cooling air is wasted in supplying cooling air to relatively cool zones.

SUMMARY OF THE INVENTION

The foregoing problems are overcome and other advantages are had by the present invention that provides a single wall annular combustor liner having multiple superimposed differential patterns of multi-hole film cooling holes disposed through the liner wall so as to provide different amounts of film cooling air to different portions of the liner as required in order to save cooling air. In the preferred embodiment differential cooling patterns are based on a base pattern of cooling holes wherein each differential pattern is formed by skipping or blanking patterns of holes and wherein one or more blanked cooling hole patterns, or blanks, may be superimposed on one another.

For the purposes of this invention superpositioning of differential cooling hole patterns that are based on a common base pattern presupposes hole registration such that all holes in each pattern including the base pattern are aligned and that there can never be more holes in a given row or more rows in a given pattern than there are in the corresponding base pattern.

The cooling hole patterns comprise many small film cooling holes, angled sharply downstream from the cold side to the hot side of the liner, and spaced closely together. Film cooling holes of the present invention should be small enough to promote good film cooling yet large enough to avoid unacceptable levels of hole clogging.

An exemplary embodiment of the present invention provides an annular combustor liner having a base pattern of multi-hole film cooling holes having a diameter of about 20 mils, a slant angle of 20 degrees, spaced closely together about 6 ½ to 7 ½ hole diameters apart, and having axially adjacent rows of holes circumferentially offset by half the angle between circumferentially adjacent holes to further enhance the evenness of the cooling film. The base pattern may have an equal number of cooling holes in each row or may have a generally fixed distance between the cooling holes in each row. A first differential cooling pattern skips every fourth row of cooling holes in the base pattern to save cooling air. A second differential cooling pattern omits a plurality of circumferentially adjacent holes in every third row of the base pattern. This pattern creates arcs extending over portions of the annular circumference generally coinciding and aligned with cold streaks, where the absence of a portion of a row of cooling holes lowers the amount of cooling air to that needed to cool the cold streaks. A third differential cooling pattern skips holes within a radius around dilution air holes in a combustion section liner so as to prevent stress risers.

The present invention contemplates the use of different base patterns in different axial locations along the liner as exemplified in a fourth cooling pattern at the aft end of a combustion section liner that has an inter-row spacing twice that of the first base pattern and an inter-hole spacing equal to that of the first base pattern thereby providing 50% of the base flow in order to reduce the temperature profile factor of the air entering the turbine to minimize the spanwise temperature variation or profile.

In accordance with the preferred embodiment of the present invention, the combustor liner may be corrugated so as to form a wavy wall that is designed to prevent buckling and is particularly useful for outer liners in the combustion section of gas turbine engines and may also be useful for exhaust duct burner liners in aircraft gas turbine engines having afterburners.

ADVANTAGES

Combustor liners made in accordance with the present invention dramatically reduce the amount of cooling air used to film cool combustor liners and reduce the axial and circumferential temperature gradients typically found in conventional nugget or panel film cooled combustor liners. Reduction of these gradients results in a consequent reduction in thermal hoop stress and improved low cycle fatigue life.

Another advantage provided by the present invention is a reduction in the amount of variation in the spanwise or radial temperature profile of the air entering the turbine.

BRIEF DESCRIPTION OF THE DRAWINGS

The foregoing aspects and other features of the invention are explained in the following description, taken in connection with the accompanying drawings where:

FIG. 1a is a perspective view of the core engine combustion section of the engine depicted in FIG. 1.

FIG. 2c is a portion of an annular combustor liner illustrating an alternative to the second exemplary differential pattern of multi-hole film cooling holes for spiral pattern swirl heating based on the base pattern in FIG. 2.

FIG. 2d is a portion of an annular combustor liner illustrating a third exemplary differential pattern of multi-hole film cooling holes wherein an area around dilution holes is omitted in accordance with one embodiment of the present invention.

FIG. 2e is a portion of an annular combustor liner illustrating an alternative base pattern of multi-hole film cooling holes.

FIG. 3 is a partial flat plan form view of an annular combustor liner in the core engine combustion section of the engine depicted in FIG. 1 having superimposed multi-hole film cooling hole patterns in accordance with the present invention.

DETAILED DESCRIPTION OF THE INVENTION

Figure 1:
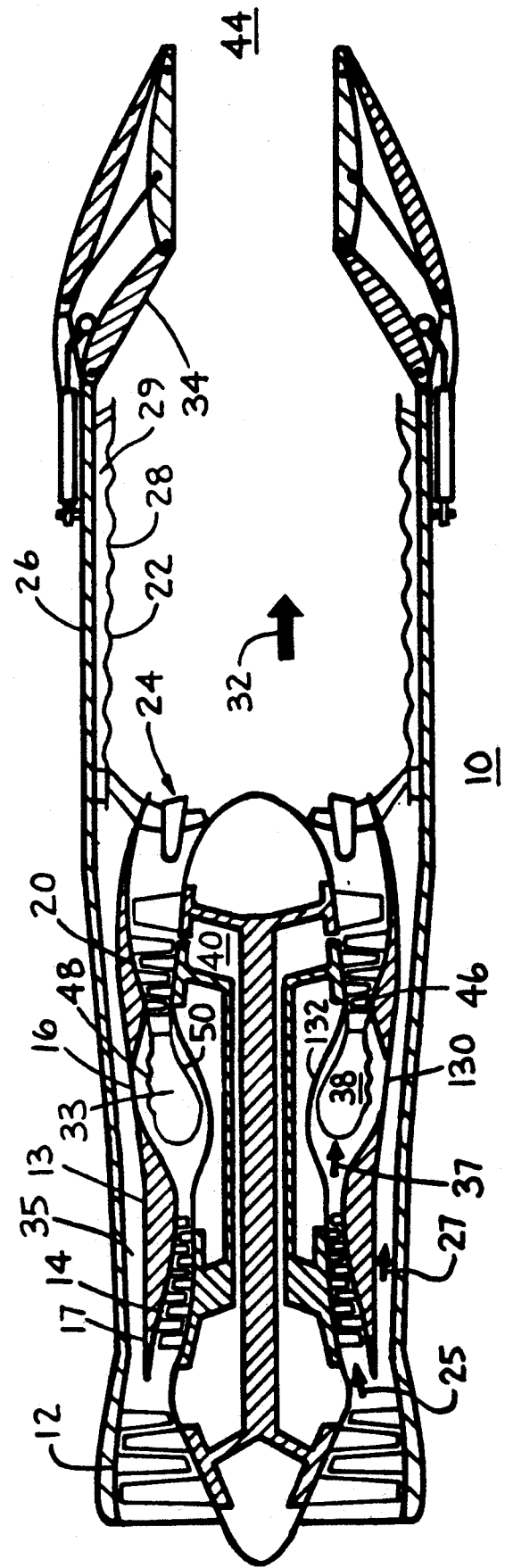
FIG. 1 is a diagrammatic view of a typical gas turbine engine including a core engine combustion section and an afterburning exhaust section having combustor liners in accordance with the present invention.

Referring to FIG. 1, a typical gas turbine engine 10 is shown comprising a fan section 12 in serial flow relationship with an engine core 13 and a by-pass duct 35 generally disposed, in concentric fashion, about engine core 13. Flow from engine core 13 and by-pass duct 35 is discharged to an exhaust section 22 having a nozzle 34 to help produce thrust. A splitter 17 by-passes a portion of the air flow 27, referred to as by-pass flow, from fan section 12 through by-pass duct 35 around engine core 13. The remaining airflow, referred to as core air flow 25, is compressed by compressor 14 and discharged to a combustion section 16 that includes axially and circumferentially extending outer and inner combustor liners 48 and 50, respectively. Outer and inner combustor liners 48 and 50 respectively are radially spaced from each other to define a portion of annular combustion flow path or combustion zone 33 therebetween where a portion of core flow 25 is mixed with fuel and the resultant mixture is combusted. Combustion section 16 produces hot combustion gases that are mixed with the remainder of the compressor discharge flow and the resultant hot effluent is then flowed to the turbine section 20 to power compressor section 14 and fan section 12.

An afterburner 24, as illustrated in FIG. 1, is disposed in exhaust section 22 downstream of turbine section 20 and is operable for burning additional fuel with bypass air 27 and core flow 25 in order to augment or produce additional thrust. Exhaust section 22 includes an annular case 26 and an annular afterburner liner 28 radially inward of case 26, forming a cooling plenum 29 therebetween, to contain gas flow 32. Afterburners are often referred to as augmenters.

Outer and inner combustor liners 48 and 50 and afterburner liner 28 provide some generally similar functions. They contain the hot combustion gases and provide a flowpath suitable to promote efficient combustion. Pressurized air enters combustion section 16 where it is mixed with fuel and burned. The hot gases of combustion, which may in some gas turbine engines exceed 3000° F. exit combustion section 16, flow thereafter past turbine vanes 46 and through the remaining portion of turbine section 20. The hot gases are then expelled at a high velocity from engine 10 through exhaust nozzle 34 to provide thrust by engine 10.

Referring now to FIG. 1a, a perspective view of the combustion section 16 in FIG. 1 is depicted comprising a combustor assembly 38 positioned in the compressor discharge flow 37 between an outer combustor casing 130 and an inner combustor casing 132 in energized fluid supply communication with turbine section 20 denoted by turbine vanes 46. Combustor assembly 38 is further comprised of axially and circumferentially extending outer and inner combustor liners 48 and 50, respectively, radially spaced from each other to define a portion of annular flow path or combustion zone 33 therebetween. Outer liner 48 and outer casing 130 form an outer combustor passage 160 therebetween and inner liner 50 and inner casing 132 form an inner passage 161 wherein said passages provide for receiving cool compressor discharge air. Disposed at the upstream end of combustor liners 48 and 50 is a plurality of fuel injectors 52 mounted within a plurality of apertures 54 in the combustor dome 31 of combustor assembly 38. Note, that combustor assembly 38 and outer and inner combustor liners 48 and 50 have a preferred annular configuration, extending circumferentially about the centerline of engine 10 and dome 31. Accordingly, fuel injectors 52 are circumferentially spaced from each other to provide a number of injection points for admitting a fuel/air mixture to combustor assembly 38 over the circumferential extent of annular combustion flow path 33.

The upstream ends of combustor liners 48 and 50 are formed with means to be attached to, and axially and radially supported by, combustor dome 31. Downstream ends 73a and 73b have radial support means such as interference fits or other conventional support means that provides radial support and allows for thermal growth of liners 48 and 50.

Outer liner 48 is preferably comprised of a single wall annular sheet or shell having generally axially extending annular corrugations 60 that provides outer liner 48 with a wavy wall cross-section 63. Outer liner 48 has a cold side 57 in contact with the relatively cool air outside the combustion zone 33 and a hot side 61 facing the combustion zone and includes a means for providing differential multi-hole film cooling of liner 48.

Means for providing differential multi-hole film cooling are illustrated in FIG. 2, 2a, 2b, 2c, 2d, and 2e as having multiple superimposable patterns 1, 2, 3, 4, and 5 of multi-hole film cooling holes 80 disposed through the liner wall as exemplified by outer liner 48. A base pattern 1 of multi-hole film cooling holes 80 comprises a continuous pattern of many small cylindrical film cooling holes, angled sharply axially downstream, and spaced closely together shown in greater detail in FIG. 4. Film cooling holes of the present invention should be small enough to promote good film cooling yet large enough to avoid unacceptable levels of hole clogging.

Figure 3A:
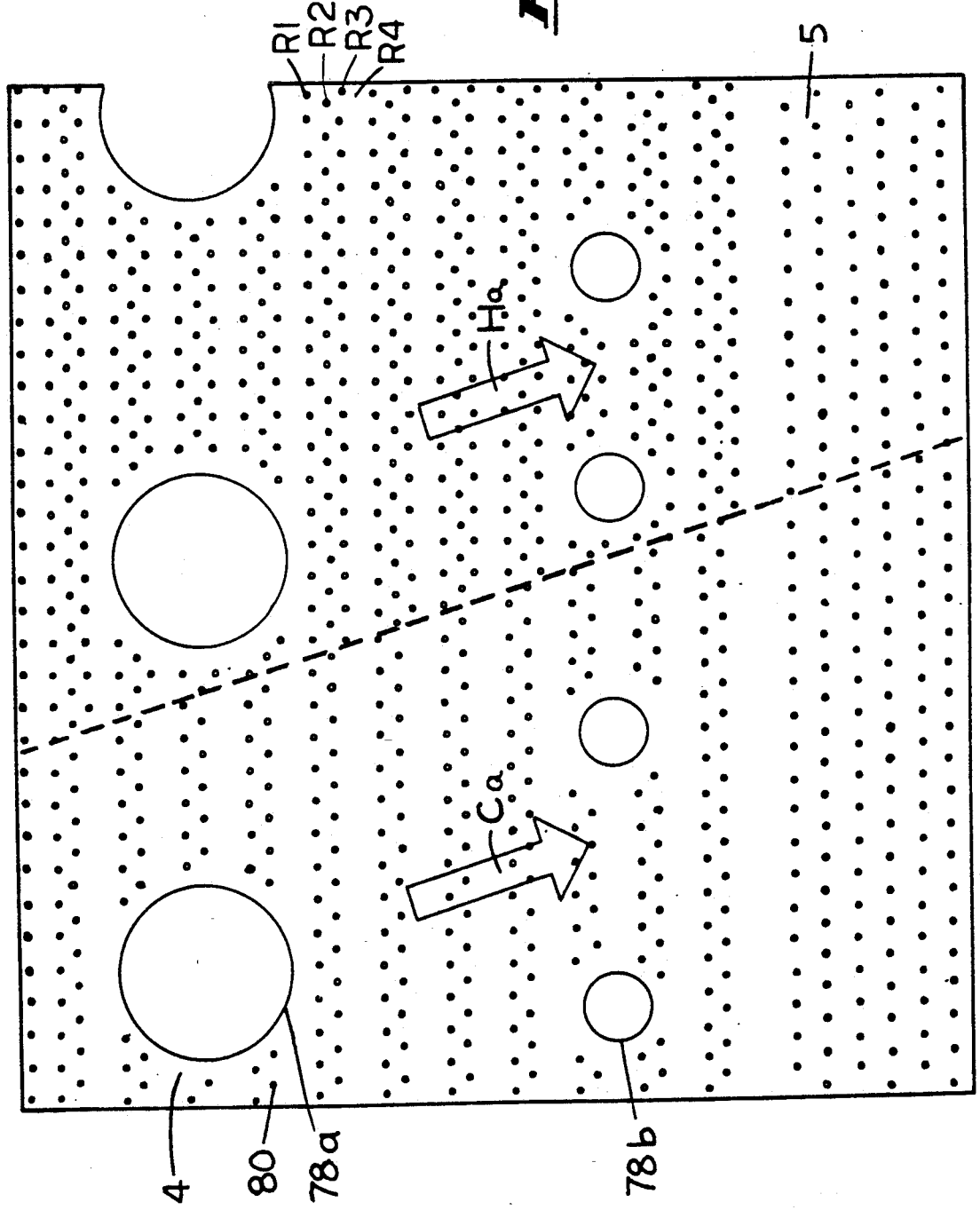
FIG. 3a is a partial flat plan form view of an annular combustor liner having an alternative multi-hole film cooling hole pattern for a spiral swirl pattern.

Briefly referring to FIGS. 3 and 3a, superimposed differential multi-hole film cooling patterns are illustrated for two alternative patterns to demonstrate the nature of what is meant by superposition. Note that superpositioning involves the blanking or skipping of cooling holes such that once holes are skipped or blanked they cannot be replaced by other holes in other superimposed patterns. In other words the blanked or skipped holes are cumulative. The present invention contemplates repeating patterns of holes that may comprise one or more rows and is not limited to the four row repeating pattern illustrated herein.

Figure 4:
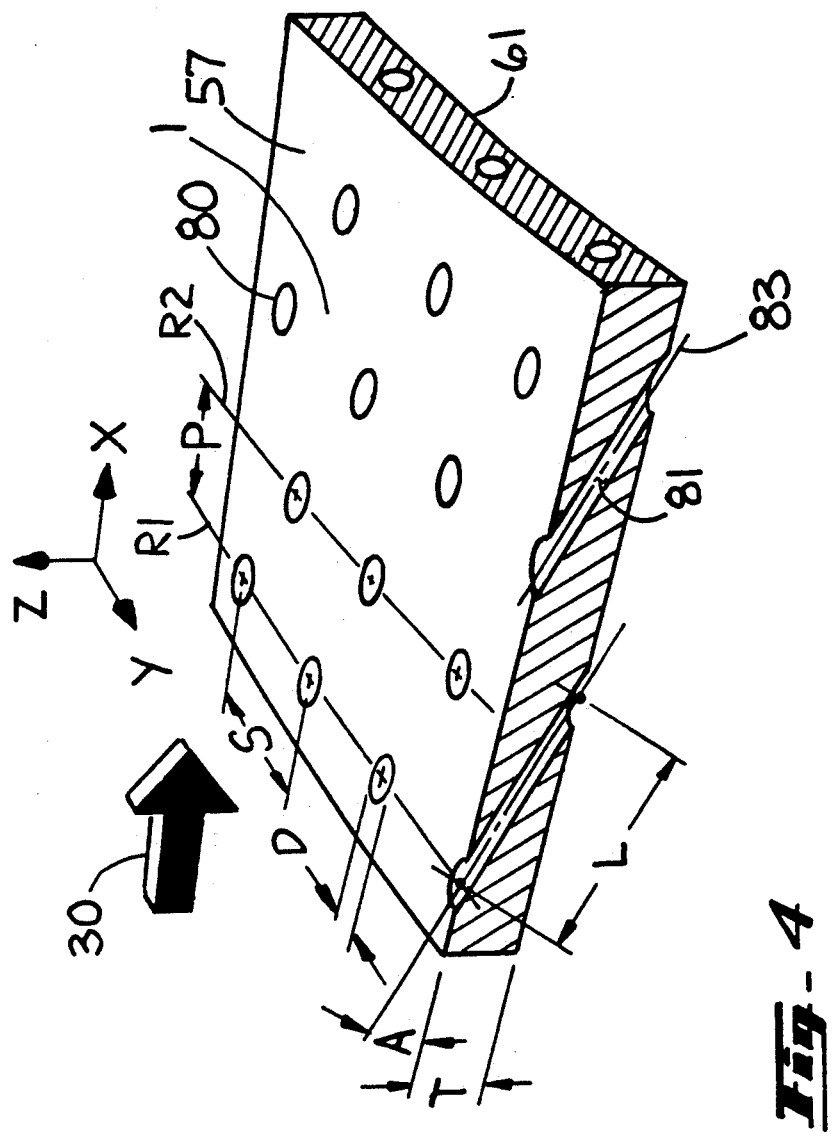
FIG. 4 is an enlarged perspective view of a portion of the combustor liner in FIG. 3 illustrating multi-hole film cooling holes.

Referring briefly to FIG. 4, the preferred embodiment of the present invention provides an annular combustor liner having a first base pattern 1 of multi-hole film cooling holes 80 having a diameter D of about 20 mils, a slant angle A of about 20 degrees, wherein the cooling holes 80 are spaced closely together. The exemplary embodiment illustrated herein provides circumferentially adjacent cooling holes 80 having an inter-hole spacing S about 6 ¼ to 7 ¼ hole diameters D and an inter-row spacing P between axially adjacent rows R1 and R2 of cooling holes 80 in the same range. In order to provide a more even circumferential distribution of cooling air, axially adjacent rows R1 and R2 of holes 80 are circumferentially offset by about half the angle or distance between circumferentially adjacent holes or by half the axial distance between row R2 and the previous row R1 of cooling holes. This is done to further enhance the evenness and effectiveness of the cooling film.

Referring again to FIG. 2a, a first differential cooling pattern 2 skips every fourth row R4 of cooling holes thereby yielding a cooling flow rate equal to 75% (25% reduction) of the base cooling rate. A second differential cooling pattern 3, shown in FIG. 2b, omits a plurality of circumferentially adjacent holes 19 in a third row R3 of each successive group of four rows so as to provide arcs, represented by areas H and C within the dotted outlines, of the annular liner with different amounts of cooling air. The area labelled H represents a hot zone that is usually caused by swirl and therefore has more film cooling holes 80 allocated than the relatively cooler area C. This reduction of one row again yields an approximately 25% cooling reduction that, when superimposed with first differential cooling pattern 2, yields an average 50% reduction in cooling flow in the cooler area C while a 25% reduction remains in the hotter zone H. FIG. 3 illustrates a first exemplary superimposed differential cooling pattern derived from base and superimposed patterns 1, 2, 3, 4, and 5.

A combustor liner subject to spiral shaped swirl patterns may use an alternative second differential cooling pattern 3a illustrated in FIG. 2c designed to accommodate spiral shaped hot and cold zones Ha and Ca that, in the plan form illustration of FIG. 3a, are skewed with respect to the axial direction. The alternative second differential cooling pattern 3a skips a second plurality of circumferentially adjacent holes 19a in a third row of each successive group of four rows whereby in each row the plurality of cooling holes 80 omitted is circumferentially rotated with respect to the preceding plurality so as to provide a skewed, with respect to the axial direction, differential cooling pattern 3a as shown in the plan form illustration of FIGS. 2c and 3a. FIG. 3a illustrates a second exemplary superimposed differential cooling pattern derived from base and superimposed patterns 1, 2, 3a, 4, and 5.

A third differential cooling pattern 4, shown in FIG. 2d, skips holes within a radius around dilution air holes 78a and 78b in a combustion section liner so as to prevent stress risers. A fourth differential cooling pattern 5, illustrated in FIG. 2e, comprises a second base pattern at the aft end of a combustion section liner 48 that has an inter-row spacing twice that of the first base pattern and an inter-hole spacing equal to that of the first base pattern thereby providing only 50% of the first base pattern flow in order to reduce the temperature profile factor of the air entering the turbine to minimize the spanwise temperature variation or profile. Differential cooling patterns 4 and 5 are shown in their superimposed embodiment in FIGS. 3 and 3a to further illustrate the feature of superposition and the preferred embodiment of the present invention.

The base pattern of holes may be determined by various methods including analytical, empirical or a combination of the two. One exemplary combustion section liner in accordance with one embodiment of the present invention as illustrated in FIG. 4 has a base pattern 1 comprising axially disposed circumferential rows of multi-hole cooling holes 80 having a diameter D of about 25 mils. Circumferentially adjacent holes and axially adjacent rows of holes R1 and R2, are spaced a distance S apart about 150 mils (0.150"). Each row contains 432 equally spaced multi-hole film cooling holes 80. Therefore for about a 7 ½ inch long cooled portion of liner the base pattern comprises 49 rows and a first preferential cooling hole pattern 2, which skips every fourth row, has a pattern of 36 cooling hole rows that reduces film cooling air flow by 25% over the base amount of cooling air flow.

Multi-hole film cooling holes 80 are nominally 0.025"" in diameter and are laser drilled from the hot side 61, at 20° to the surface, aft looking forward. The first and last row may be drilled at slightly different angles, 30° and 26° respectively, to aid in proper cooling flow at the liner boundaries. With a nominal wall thickness of 0.080", the hole L/D ratio is nominally 9.4. Since all cooling holes are drilled on the basis of 432 equally spaced holes per row, this results in reduced hole density at the larger diameter aft end of the liner. The hole pitch/diameter (ratio of distance between hole center-lines to hole diameters) ratio varies from 6.1 to 7.0 as hole to hole spacing varies from 0.152" to 0.175" from forward to aft on the liner. A second differential hole pattern 3 provides a pattern of an equal number of adjacent holes and blanks that is repeated 18 times around the liner, so as to coincide with the 18 fuel nozzle swirlers of the exemplary illustration in FIGS. 1 and 2. Axially adjacent rows such as R1 and R2 may be offset by half the distance between holes in the base pattern to improve the evenness and hence the film cooling effectiveness of the present invention.

Note that laser and other types of hole drilling processes such as electron beam may produce holes that are slightly frusto-conical in shape instead of perfectly cylindrical. These slightly conical holes are conventionally regarded as cylindrical holes and are included in any references herein to cylindrical holes. It should be noted that smaller slant angles A may be advantageous for improved cooling and therefore an alternative slant angle A in the range of about 20° to 15° may be used if the associated costs are warranted. Slant holes smaller than 15 degrees may weaken the liner structure. Further note that though exemplary illustration employs cooling holes 80 having a diameter of 25 mils, the preferred diameter is 20 mils (0.02 inches), and cooling holes 80 are preferably spaced apart from each other about 150 mils (0.15 inches) off center or about seven and one half (7 ½) hole diameters.

Figure 2:
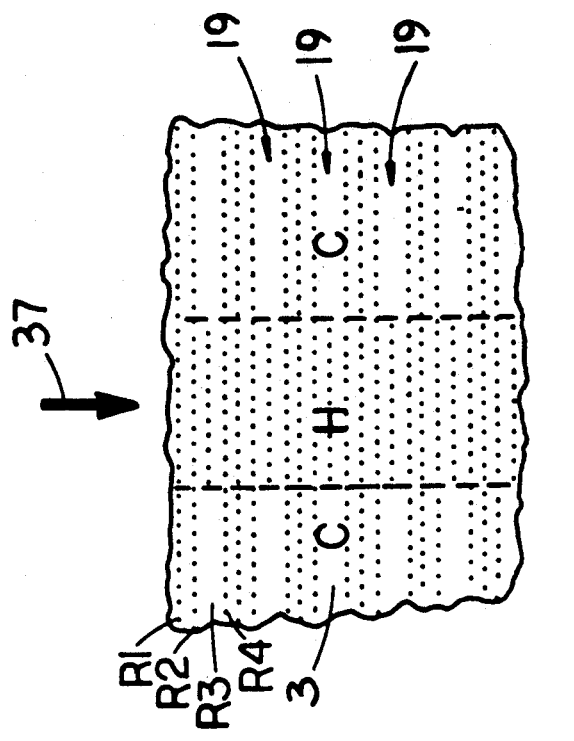
FIG. 2 is a partial flat plan form view of an annular combustor liner in the core engine combustion section of the engine depicted in FIG. 1 illustrating an exemplary base pattern of multi-hole film cooling holes in accordance with the present invention.
Figure 2A:
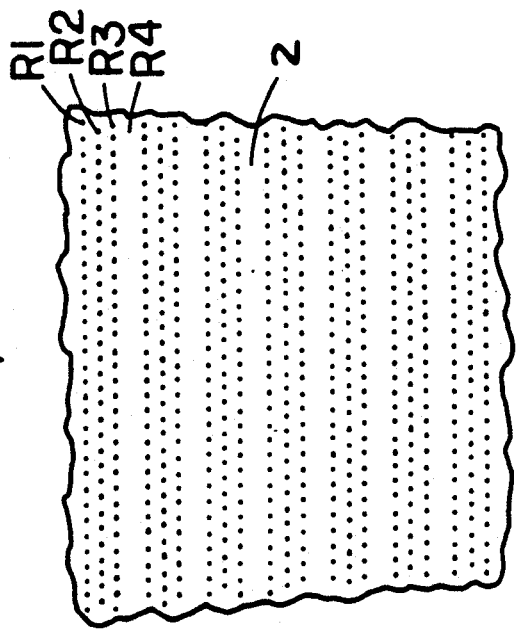
FIG. 2a is a portion of an annular combustor liner illustrating a first exemplary differential pattern of multi-hole film cooling holes wherein every fourth row of holes in the base pattern in FIG. 2 is omitted in accordance with the present invention.
Figure 2B:
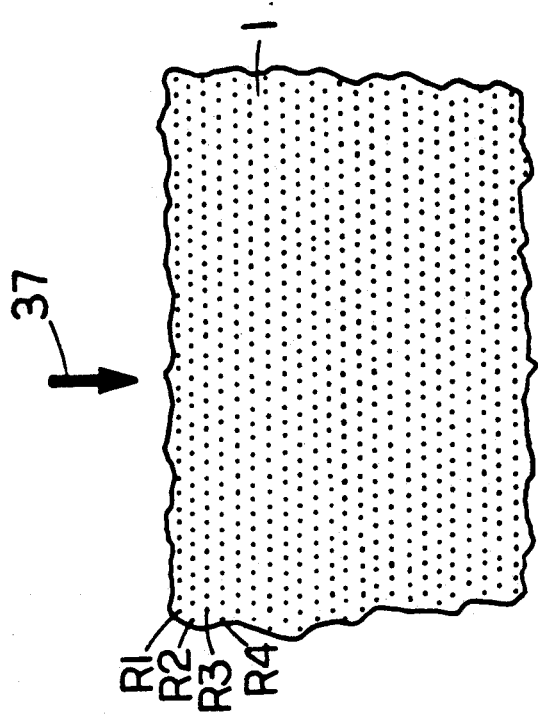
FIG. 2b is a portion of an annular combustor liner illustrating a second exemplary differential pattern of multi-hole film cooling holes for swirl heating based on the base pattern in FIG. 2.

It may be preferable, particularly in the case of outer liners 48 and afterburner liners 28, to provide a buckling resistance means such as corrugations 60 shown in FIGS. 1 and 2. Buckling of outer liner 48 due to inward pressure load is a primary design consideration. Small and medium diameter short length combustors may only require a reasonable liner thickness combined with its formed shape and end support provided by combustor dome 31 and stator seal to provide sufficient buckling margin. This margin can be increased by using significant axial curvature in the liner to increase its section modules. Very large combustor liners, having about a 30 inch diameter or larger, such as outer liner 48 in combustion section 16 and long combustor liners such as afterburner liner 28 may require additional features to prevent buckling. The present invention provides cooling patterns that allow the corrugations 60 of outer liner 48 and afterburner liner 28 that restrict the liner deflection and resist buckling to be efficiently cooled.

The buckling resistance imparted by the wave design of corrugations 60 is similar to that applied in augmenter liners and the cooling hole patterns must be designed to provide that the film effectiveness o the liner is not adversely affected by the wave form. A shallow sine wave form is preferred for maintaining the integrity of the cooling film and providing sufficient buckling resistance.

While the preferred embodiment of the present invention has been described fully in order to explain its principles, it is understood that various modifications or alterations may be made to the preferred embodiment without departing from the scope of the invention as set forth in the appended claims.

I claim:

1. A gas turbine combustion liner having a hot side and cold side, said liner comprising:
    a single wall shell having at least one differential multi-hole film cooling hole pattern comprising a plurality of small, cylindrical, closely spaced, sharply downstream angled film cooling holes, angles from the cold side to the hot side and wherein said differential multi-hole film cooling pattern comprises at least one pattern of blank spaces superimposed on a corresponding base pattern of said multi-hole film cooling holes,
    said differential multi-hole film cooling hole pattern comprises a modification of a first base cooling hole pattern comprising axially adjacent rows of multi-hole film cooling holes circumferentially offset from each other by about half the distance between said multi-hole film cooling holes of one of said rows, and
    a first differential multi-hole film cooling hole pattern comprises a pattern of blank spaces that omits a plurality of circumferentially adjacent cooling holes in a plurality of rows in said first base cooling hole pattern in an axially repetitive pattern.

2. A gas turbine combustor lines as claimed in claim 1 wherein said one differential multi-hole film cooling hole pattern comprises a first portion of said shell containing a first density of said cooling holes and a second portion of said shell containing a second density of said cooling holes.

3. A gas turbine combustor liner as claimed in claim 1 wherein said first differential multi-hole film cooling hole pattern of blanked cooling holes corresponds to a predetermined swirl pattern of the combustor.

4. A gas turbine combustor liner as claimed in claim 1 wherein a first differential multi-hole film cooling hole pattern comprises a pattern of blank spaces that omits at least one row of holes in said first base cooling hole pattern in an axially repetitive pattern.

5. A gas turbine combustor liner as claimed in claim 4 further comprising a second differential multi-hole film cooling hole pattern comprising a plurality of pluralities of circumferentially adjacent blanked cooling holes in a plurality of rows in an axially repetitive pattern and wherein said blanked cooling holes of said second differential cooling pattern are superimposed on said first differential cooling pattern.

6. A gas turbine combustor liner as claimed in claim 5 wherein said second differential multi-hole film cooling hole pattern of blanked cooling holes corresponds to a predetermined swirl pattern of the combustor.

7. A gas turbine combustor liner as claimed in claim 6 further comprising a third differential multi-hole film cooling hole pattern of said cooling holes comprising a second base cooling hole pattern on the aft end of said liner for reducing the spanwise turbine entrance air temperature profile factor.

8. A gas turbine combustor liner as claimed in claim 7 wherein said third differential multi-hole film cooling hole pattern includes an inter-row spacing twice that of said first base pattern and an inter-hole spacing equal to that of said first base pattern and axially adjacent rows of multi-row film cooling holes are circumferentially offset from each other by about half the distance between said multi-hole film cooling holes of one of said rows.

9. A gas turbine combustor liner as claimed in claim 6 including a fourth differential multi-hole film cooling hole pattern comprising an area of blanked cooling holes in said first and second base cooling hole patterns around dilution holes in said liner for preventing formation of stress risers around the dilution holes.

10. A gas turbine combustor liner having a hot side and cold side, said liner comprising:
    a single wall shell having a plurality of superimposed differential multi-hole film cooling hole patterns wherein said differential multi-hole film cooling hole pattern are derived from a first base multi-hole film cooling hole pattern comprising a plurality of small closely spaced sharply downstream angled cylindrical film cooling holes,
    wherein said differential multi-hole film cooling pattern comprises at least one pattern of blank spaces superimposed on a corresponding base pattern of said multi-hole film cooling holes,
    wherein a said first base pattern includes axially adjacent rows of multi-base film cooling holes in which the holes of adjacent rows are circumferentially offset from each other by about half the distance between said multi-hole film cooling holes of one of said rows,
    a first differential multi-hole film cooling hole pattern comprising one row of blanked holes in said first base pattern in a first axially repetitive pattern, and
    a second differential multi-hole film cooling hole pattern comprising one row of blanked holes in said first base pattern in a first axially repetitive pattern, and
    a second differential multi-hole film cooling hole pattern comprising a plurality of rows of blanked circumferentially adjacent cooling holes in a plurality of rows of said base pattern in a second axially repetitive pattern.

11. A gas turbine combustor liner as claimed in claim 10 wherein said multi-hole cooling holes have a diameter of about 25 mils and have a center-to-center spacing in the range of 6 to 7 cooling hole diameters and said base pattern comprises rows of said cooling holes having an inter-row spacing of about 6 cooling hole diameters and having an equal number of cooling holes in each row.

12. A gas turbine combustor liner as claimed in claim 10 wherein said multi-hole cooling holes have a diameter of about 20 mils and have a center-to-center spacing in the range of 6 to 7 ½ cooling hole diameters and said base pattern comprises rows of said cooling holes having an inter-row spacing in the range of 6 to 7 ½ cooling hole diameters.

13. A gas turbine combustor liner as claimed in claim 12 wherein said first base pattern comprises axially repetitive sets of four adjacent rows of cooling holes and said first differential multi-hole film cooling hole pattern comprises a pattern in which a forth row in said sets of rows comprises blanked holes and said second differential multi-hole film cooling hole pattern comprises a pattern having a plurality of blanked circumferentially adjacent cooling holes in a third row of said set of cooling holes.

14. A gas turbine combustor liner as claimed in claim 13 wherein at least a portion of said shell is corrugated to form a shallow wavy wall cross-section.

15. A gas turbine combustion section as claimed in clam 13 wherein said film cooling holes have a slant angle slanted downstream from the cold surface of said liner to the hot surface of said liner of about twenty degrees.

16. A gas turbine combustor liner as claimed in claim 15 wherein said third differential multi-hole film cooling hole pattern based on a second base pattern including an inter-row spacing twice that of said first base pattern and an inter-hole spacing equal t that of said first base pattern and axially adjacent rows of multi-hole film cooling holes are circumferentially offset from each other by about half the distance between said multi-hole film cooling holes of one of said rows.

* * * * *